(12) United States Patent
Hopkins

(10) Patent No.: US 7,613,195 B2
(45) Date of Patent: Nov. 3, 2009

(54) METHOD AND SYSTEM FOR MANAGING COMPUTER NETWORKS

(75) Inventor: Samuel P. Hopkins, Freedom, PA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 747 days.

(21) Appl. No.: 10/694,651

(22) Filed: Oct. 27, 2003

(65) Prior Publication Data

US 2005/0089028 A1    Apr. 28, 2005

(51) Int. Cl.
    *H04L 12/28* (2006.01)
(52) U.S. Cl. ........................................ 370/401; 370/254
(58) Field of Classification Search ................. 370/254, 370/351, 352, 395.1, 395.5, 395.51, 395.52, 370/395.55, 396, 397, 399, 400, 401, 402, 370/404, 405, 409
    See application file for complete search history.

(56) References Cited

U.S. PATENT DOCUMENTS

| | | | | |
|---|---|---|---|---|
| 6,044,402 A * | 3/2000 | Jacobson et al. | ............. | 709/225 |
| 6,134,591 A | 10/2000 | Nickles | | |
| 6,662,221 B1 * | 12/2003 | Gonda et al. | ................ | 709/223 |
| 6,937,574 B1 * | 8/2005 | Delaney et al. | .............. | 370/254 |
| 7,124,197 B2 * | 10/2006 | Ocepek et al. | ............... | 709/232 |
| 7,457,290 B1 * | 11/2008 | Salama et al. | ................ | 370/392 |
| 2003/0131263 A1 * | 7/2003 | Keane et al. | .................. | 713/201 |
| 2003/0147403 A1 * | 8/2003 | Border et al. | .......... | 370/395.53 |
| 2003/0152067 A1 * | 8/2003 | Richmond et al. | .......... | 370/352 |
| 2003/0163920 A1 * | 9/2003 | Gehringhoff et al. | ........ | 29/897.2 |
| 2003/0171852 A1 | 9/2003 | Vollmer et al. | | |
| 2004/0088571 A1 * | 5/2004 | Jerrim et al. | ................. | 713/201 |
| 2004/0090972 A1 * | 5/2004 | Barrett et al. | ................ | 370/401 |
| 2004/0160903 A1 * | 8/2004 | Gai et al. | ..................... | 370/254 |
| 2004/0223499 A1 * | 11/2004 | Sanderson et al. | ...... | 370/395.52 |
| 2004/0264402 A9 * | 12/2004 | Whitmore et al. | ........... | 370/328 |

FOREIGN PATENT DOCUMENTS

| EP | 1 202 494 A | 5/2002 |
|---|---|---|
| WO | WO 01/06726 A | 1/2001 |
| WO | WO 02/076017 A | 9/2002 |
| WO | WO 03/060671 A | 7/2003 |

* cited by examiner

Primary Examiner—Pankaj Kumar
Assistant Examiner—Eunsook Choi

(57) ABSTRACT

A telecommunication system includes a first network having a first node and a second node which can communicate with each other. The system includes a third node separate and apart from the first network. The system includes a communication portion in communication with the first network and the third node through which the third node is only able to communicate with the first node, but not with the second node through the first node. A telecommunication system using the Internet includes a first network having a first node having a first port, a second node having a second port and a primary server in communication with each other. The system includes a second network having a third node and a fourth node and a client server in communication with each other. The third node has a connection with the port of the first node via the client server and through the Internet and the primary server using gateway methodology so the second node cannot be accessed by the third node through the first node. The present invention pertains to a method for telecommunications.

13 Claims, 1 Drawing Sheet

METHOD AND SYSTEM FOR MANAGING COMPUTER NETWORKS

FIELD OF THE INVENTION

The present invention is related to the monitoring and managing of computer networks. More specifically, the present invention is related to the monitoring and managing of computer networks and other devices securely over the Internet.

BACKGROUND OF THE INVENTION

Cost Reduction & ROI—Normally remote management of networks and other devices are handled through the use of frame-relay or other dedicated circuits. These costs are substantial and sometimes cost restrictive. This invention utilizes an existing Internet connection which reduces costs through the elimination of the dedicated circuit.

Security—When networks are connected to each other over the Internet they rely on VPN technologies. VPN technologies connect two networks together and allow full traffic to be transmitted from one to another. This poses security risks should an intruder compromise one network because both networks are connected together. Furthermore, managed service providers are at an increased risk because they generally do not own the remote network and cannot control its security practices. This invention connects two networks together for network and device management by extending specific TCP/IP ports. Security risks are eliminated because both networks do not have a full traffic connection.

NAT—Many networks utilize Network Address Translation (NAT) because of the limited IP addresses available on the Internet. NAT allows companies to utilize a non-routable private IP address range for their network while only utilizing one single routable public IP address. NAT works by monitoring and replacing the private IP address with the public IP address of any network packets destined for Internet addresses. NAT and VPN are not compatible because of the way NAT replaces IP addresses. This invention solves remote management of networks and other devices when the remote network utilizes NAT because IP replacement does not affect its operation.

Decreased Installation Time—Normally remote network and device management is done via a frame-relay or other dedicated circuit. Normal installation times for these circuits are 60-90 days. This invention utilizes an existing Internet connection and significantly reduces the amount of time it takes to start the management of networks and devices.

SUMMARY OF THE INVENTION

The present invention pertains to a telecommunication system. The system comprises a first network having a first node and a second node which can communicate with each other. The system comprises a third node separate and apart from the first network. The system comprises a communication portion in communication with the first network and the third node through which the third node is only able to communicate with the first node, but not with the second node through the first node.

The present invention pertains to a telecommunication system using the Internet. The system comprises a first network having a first node having a first port, a second node having a second port and a primary server in communication with each other. The system comprises a second network having a third node and a fourth node and a client server in communication with each other. The third node has a connection with the port of the first node via the client server and through the Internet and the primary server using gateway methodology so the second node cannot be accessed by the third node through the first node.

The present invention pertains to a method for telecommunications. The method comprises the steps of communicating between a first node of a first network and a second node of the second network. There is the step of communicating between a third node separate and apart from the first network through a communication portion and the first node but not the second node through the first node.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
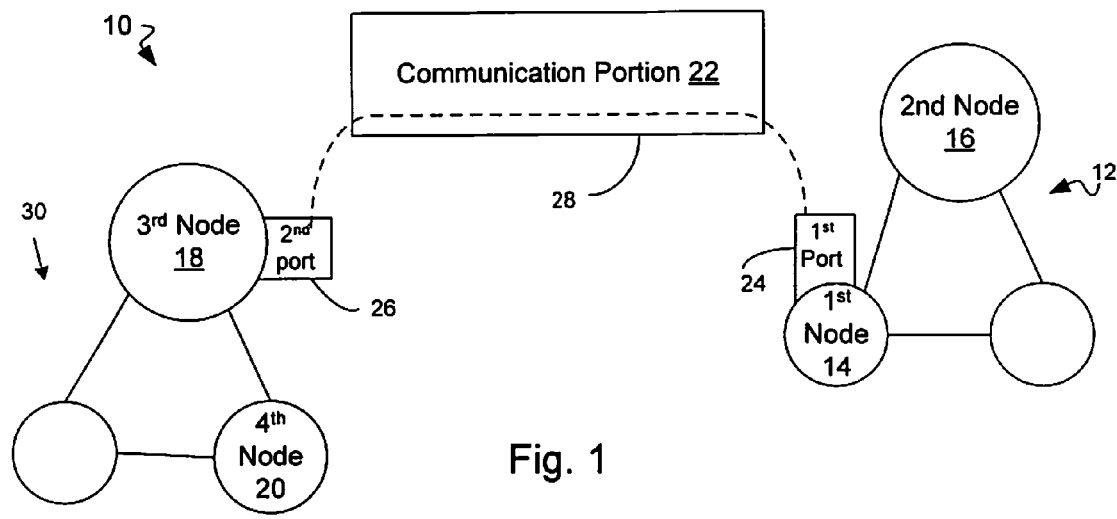
FIG. 1 is a schematic representation of a system of the present invention.

Referring now to the drawings wherein like reference numerals refer to similar or identical parts throughout the several views, and more specifically to FIG. 1 thereof, there is shown a telecommunication system 10. The system 10 comprises a first network 12 having a first node 14 and a second node 16 which can communicate with each other. The system 10 comprises a third node 18 separate and apart from the first network 12. The system 10 comprises a communication portion 22 in communication with the first network 12 and the third node 18 through which the third node 18 is only able to communicate with the first node 14, but not with the second node 16 through the first node.

Preferably, the first node 14 has a first port 24 and the third node 18 has a second port 26, and wherein the third node 18 only communicates with the first port 24 of the first node 14 through the communication portion 22. The communication portion 22 preferably includes the Internet 28. Preferably, the third node 18 forms a connection with the first node 14 through an Internet 28 of the communication portion 22.

There is preferably a second network 30 having the third node 18 and a fourth node 20 which can communicate with each other but only with the first node 14 or the second node 16 through individual connections through the first port 24 of the first node 14 or the second port 26 of the third node 18, respectively. Preferably, the first network 12 monitors and manages the second network 30.

Figure 2:
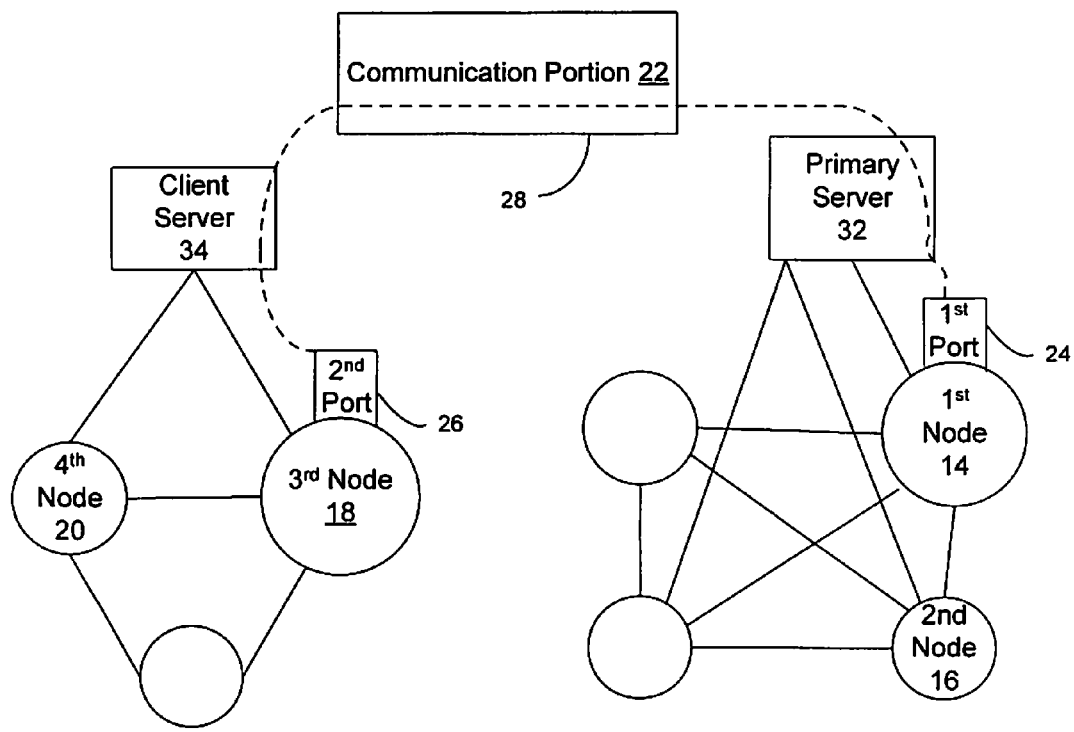
FIG. 2 is a schematic representation of an alternative embodiment of a system of the present invention.

The present invention pertains to a telecommunication system 10 using the Internet 28, as shown in FIG. 2. The system 10 comprises a first network 12 having a first node 14 having a first port 24, a second node 16 and a primary server 32 in communication with each other. The system 10 comprises a second network 30 having a third node 18 having a second port 26 and a fourth node 20 and a client server 34 in communication with each other. The third node 18 has a connection with the port of the first node 14 via the client server 34 and through the Internet 28 and the primary server 32 using gateway methodology so the second node 16 cannot be accessed by the third node 18 through the first node.

Preferably, the client server 34 encrypts data from the third node 18 on the connection and the primary server 32 decrypts data for the first node 14. The first network 12 preferably monitors and manages the second network 30.

The present invention pertains to a method for telecommunications. The method comprises the steps of communicating between a first node 14 of a first network 12 and a second node 16 of the first network 12. There is the step of communicating between a third node 18 separate and apart from the first network 12 through a communication portion 22 and the first node 14 but not the second node 16 through the first node.

Preferably, the third node 18 communicating step includes the step of communicating between the third node 18 and only with a first port 24 of the first node 14 through the communication portion 22. The third node 18 communicating step preferably includes the step of communicating between the third node 18 and the first node 14 through an Internet 28 of the communication portion 22.

Preferably, there are the steps of communicating between the third node 18 of a second network 30 and a fourth node 20 of the second network 30; and communicating between the first network 12 and the third and fourth nodes 18, 20 of the second network 30 only through individual connections through the first port 24 of the first node 14. There is preferably the step of monitoring and managing the second network 30 by the first network 12.

In the operation of the invention, the system 10 and method provides for monitoring and managing computer networks and other devices over the Internet 28.

Computer networks formed of computers and other devices are managed over a communication network which may include all or part of the Internet 28, via TCP/IP port extension using gateway methodology. It does not utilize VPN technology but rather it extends specifically selected TCP/IP ports through the communication network.

On the remote side (the second network) there is client software located on a first device. On the primary side (the first network) there is server software located on a second device that accepts connections from the first device. This connection is over a specific TCP/IP port from the client to the server and over some communications network which may include all or part of the Internet 28. This TCP/IP port is predefined by an administrator and will remain constant and cannot be changed unless both the client and server are physically changed. The TCP/IP communication connection is established at some point and remains open as long as a communication path is required. When information must pass from the first device to the second device, it can be encrypted on the client side for added security. The server side would then receive this information and decrypt it. The first device may be configured to accept information from a third locally attached device to be passed onto the second device. It is important to note, however, that the third device has no way to directly access the second device—rather, it must pass information to the first device to be transmitted. The first device is acting as a gateway. The third device cannot utilize any port between the first and second device except for the TCP/IP port that has been predefined from the first to second device and only if it is allowed to by the first device.

This connection technique is extremely secure because it merely extends TCP/IP ports and does not connect the two networks together. Current methods of managing networks and devices over the Internet 28 utilize VPN technologies. In a VPN, all network data passing between the networks is encrypted but all TCP/IP information can pass from one network to another and from any device to any device from any TCP/IP port to any TCP/IP port unrestricted. This means that should an intruder compromise one network, they then have access to the second network 30 because they are seamlessly connected. This system 10 and method provides a way of connecting remote networks and devices for management that does not allow all TCP/IP information to pass. This system 10 and method provides no way for an intruder to comprise a network should they gain access to the other except for the specifically defined TCP/IP port.

EXAMPLE

VPN—When two networks are connected together via VPN, a person on node A of network A can access a TCP/IP port of nodes B, C or D of network B unrestricted. Meaning node A of network A can access payroll files on node B of network B, HR information on node C of network B, or the website located on node B of network B without any modification or special configuration of node A of network A.

TCP/IP port extension—When two networks are connected together via TCP/IP port extension, node A of network A can only access a specific TCP/IP port of node B on network B. Meaning node A of network A can only access the website located on node B of network B but not the payroll files on node B of network B or HR information located on node C of network B. Furthermore, if there are any other services running on a different TCP/IP port of node D of network B node A of network A cannot access them because node A of network A is only able to connect to a single specific TCP/IP port of node D of network B (assuming it was configured to reach only the website).

Normally, remote networks are monitored by placing a polling station onto the remote network to monitor remote devices. As error conditions are detected, this polling station sends information back to a primary location for resolution. Normally, the network connectivity between the polling station and primary location is over a frame-relay circuit or some other leased line for security reasons. Sending this information over an existing Internet connection poses a security risk that most companies will not take because the information is unencrypted. In prior art, the solution was to connect both networks via a VPN, which does encrypt the information. While VPNs solve the encryption problem, they bring their own inherent problems with them. VPNs connect two networks together and allow full TCP/IP traffic to pass. Should an intruder compromise one network, they can gain access to the second network. Furthermore, when two different companies are connected as in the case of Company A and a managed service provider, the risks are compounded because neither company controls the security practices of the other. The system 10 solves the problems of sending unencrypted information over the Internet and the problems brought on by VPNs. With the system 10, the polling station has client software placed on it that makes a TCP/IP connection to its server counter part on the primary side. All data that passes over this communication port is encrypted by the client and decrypted by the server and effectively creates a secure connection. Because both networks are not connected together, as you would find in a VPN, there is no way to comprise the second network.

EXAMPLE

Polling Station A on network A detects that node A of network A is unavailable and generates an alarm. It passes this alarm to the port extension software located on the same device. This software takes the information, encrypts it, and sends it to the primary side server counterpart. This primary server counterpart receives the information, decrypts it and then either passes it along to another node or processes it itself.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A telecommunication system comprising:
a first network having a primary server and a first node with a first TCP/IP port and a second node, and a second network having a client server and a third node with a second TCP/IP port which can communicate with the first TCP/IP port, the first TCP/IP port and the second TCP/IP port having been predefined by an administrator, wherein the first TCP/IP port and the second TCP/IP port remain constant and cannot be changed unless both the client server and the primary server are physically changed;
a communication portion in communication with the first network and the third node and through which the third node is only able to communicate with the first TCP/IP port of the first node via TCP/IP port extension using gateway methodology, such that the second node cannot be accessed by the third node; and
wherein the system is configured such that the third node cannot utilize any port between the first node and the third node except for the first and second TCP/IP ports, the third node able to communicate with the second node only if the third node is allowed to by the first node which prevents an intruder who compromises the second network from gaining access to the first network except for the first TCP/IP port.

2. A system as claimed in claim 1 wherein the communication portion includes the Internet.

3. A system as claimed in claim 2 wherein the third node forms a connection with the first node through an Internet of the communication portion.

4. A system as claimed in claim 3 wherein the second network has the third node and a fourth node which can communicate with each other but only with the first node or the second node through individual connections through the first port of the first node or the second port of the second node, respectively.

5. A system as claimed in claim 4 wherein the first network monitors and manages the second network.

6. A system as claimed in claim 1, and configured for using the Internet, comprising:
the first network having the primary server in communication with the first node and the second node; and
the second network having a fourth node and the client server in communication with each other and the third node, the third node having a connection with the port of the first node via the client server and through the Internet and the primary server using gateway methodology so the second node cannot be accessed by the third node through the first node.

7. A system as claimed in claim 6 wherein the client server encrypts data from the third node on the connection and the primary server decrypts data for the first node.

8. A system as claimed in claim 7 wherein the first network monitors and manages the second network.

9. A method for telecommunications comprising the steps of:
communicating between a first node of a first network and a third node of a second network, the first node having a first TCP/IP port and the third node having a second TCP/IP port, the first TCP/IP port and the second TCP/IP port having been predefined by an administrator, wherein the first TCP/IP port and the second TCP/IP port will remain constant and cannot be changed unless both a client server of the second network and a primary server of the first network are physically changed; and
communicating between the first network and the third node of the second network, separate and apart from the first network, through a communication portion through which the third node is only able to communicate with the first TCP/IP port of the first node via TCP/IP port extension using gateway methodology, such that a second node of the first network cannot be accessed by the third node through the first node;
wherein the third node cannot utilize any port between the first node and the third node except for the first and second TCP/IP ports, the third node able to communicate with the second node only if the third node is allowed to by the first node which prevents an intruder who compromises the second network from gaining access to the first network except for the first TCP/IP port.

10. A method as claimed in claim 9 wherein the third node communicating step includes the step of communicating between the third node and only with a first port of the first node through the communication portion.

11. A method as claimed in claim 10 wherein the third node communicating step includes the step of communicating between the third node and the first node through an Internet of the communication portion.

12. A method as claimed in claim 11 including the steps of communicating between the third node of the second network and a fourth node of the second network; and communicating between the first network and the third and fourth nodes of the second network only through individual connections through the first port of the first node or the second port of the second node, respectively.

13. A method as claimed in claim 12 including the step of monitoring and managing the second network by the first network.

\* \* \* \* \*